US005251368A

United States Patent [19]

Somerville et al.

[11] Patent Number: 5,251,368

[45] Date of Patent: Oct. 12, 1993

[54] INTERNAL LOCKING PULLER DEVICE

[76] Inventors: Dean S. Somerville, 805 Sunflower Ave., P.O. Box 246, Cooperstown, N. Dak. 58425; Mitchel D. Trostad, R.R. 1, Box 107, Aneta, N. Dak. 58212

[21] Appl. No.: 969,955

[22] Filed: Nov. 2, 1992

[51] Int. Cl.[5] .......... B23P 19/04

[52] U.S. Cl. .......... 29/255; 29/261

[58] Field of Search .......... 29/255, 261, 262, 275, 29/260, 259

[56] References Cited

U.S. PATENT DOCUMENTS 2,380,068 7/1945 Patton .......... 29/255

4,068,365 1/1978 Brandt et al. .......... 29/261

*Primary Examiner*—Robert C. Watson

*Attorney, Agent, or Firm*—David A. Lingbeck

[57] ABSTRACT

This invention relates to an internal locking puller device which comprises three pivotally mounted jaws, a cam ring which engageably slides along the jaws for camming together and apart the jaws for locking about bushings, bearings, seals, and the like, a disk-like collar to which the jaws are pivotally mounted, a T handle for adjustably controlling the movement of the cam ring, a slide rod, and a slide hammer slidably and reciprocally mounted on said slide rod for providing impacting force to remove the bushings, bearings, seals, and the like. The jaws have arcuate rearward portions with a pair of arcuate rails integrally extending from and along under edges thereof. The rails conform to the configuration of the arcurate rearward portions of the jaws so as to provide uniform locking strength across the jaws to virtually eliminate slippage of the jaws from internally about bushings, bearings, seals, and the like. The rearward portions of the jaws are precisely designed to greatly improve the leverage needed to substantially lock the jaws about the bushings, bearings, seals, and the like to prevent slippage of the jaws during the use of this device.

8 Claims, 5 Drawing Sheets

INTERNAL LOCKING PULLER DEVICE

BACKGROUND OF THE INVENTION

The present invention relates, in general, to an internal locking puller device for removing internal bushings, bearings, and seals as such.

Locking puller devices for pulling bushings, bearing, and seals off shafts are known in the prior art. However, those prior art locking puller devices have limited applications and weren't designed or constructed with the kinds of leverage or control necessary to effectively remove limited access bushings, bearings, or seals or the like and do not effectively lock about the object being removed resulting in the puller device slipping off the object.

One such known prior art is a PULLING DEVICE, U.S. Pat. No. 4,003,119, which comprises a plurality of jaws pivotally connected to a spider yoke, a slotted nut adjusting cone threaded on an elongate shank which is threaded in the spider yoke, a spring mounted about the plurality of jaws, a slide hammer slidably mounted on the shank for providing impacting force to remove bearings and the like, and a T handle attached to the end of the shank opposite the plurality of jaws. To spread the jaws into a locking position about a bearing or the like, the adjusting cone is rotated to engage ends of the jaws. To release the jaws from a locking position, the adjusting cone is rotated away from engagement with the ends of the jaws, allowing the spring to urge the jaws together. The distance between the engagement of the adjusting cone to the jaws and the pivot points of the jaws is quite short, thus effecting minimal leverage for locking the Pulling Device about the object being removed. Further, in limited access places, this Pulling Device cannot be effectively controlled to lock about a bearing or the like.

Another known prior art is a SCREW OPERATED BUSHING AND BEARING INSTALLING AND REMOVING TOOL WITH PIVOTAL GRIPPERS ON SAID SCREW AND HAVING IMPACT MEANS, U.S. Pat. No. 3,336,652, which comprises a rigid shaft, a spider member threaded to the shaft, a control disc, a hammer slidably mounted on the shaft for reciprocal movement along the shaft, and a plurality of elongate jaws for locking about the bushing or bearing being removed. This installing and removing tool doesn't have the leverage necessary to effectively lock about and remove limited access bearings and bushings and will slip off the object as a result.

Another known prior art is a LOCKING PULLER DEVICE, U.S. Pat. Nos. 4,007,535 and 4,068,365, which were invented by this inventor. The Locking Puller Device comprise a flangeless, disk-like collar, a shaft threaded into the collar, a plurality of tapered jaws pivotally mounted to the collar, a camming ring for camming the jaws about gears, bearings, or the like, a T-handle for moving the camming ring forwardly, and a backwardly, and a threaded shaft threaded in through the collar for engaging a shaft upon which the gear or bearing is mounted. The Locking Puller Device effectively removes bearings and gears mounted about a shaft. The Locking Puller Device locks about the exterior of the bearing or the gear, and cannot be used to remove limited access bearings, bushings, seals, or the like, because it cannot be mounted internal to the bushings, seals, bearings, or the like, all of which can be removed only by internally locking about such objects.

There is a definite need for an internal locking puller device which overcomes all of the problems noted above.

SUMMARY OF THE INVENTION

The present invention relates to an internal locking puller device comprising a flangeless, disk-like collar, three jaws pivotally mounted at spaced intervals about the collar, a threaded sleeve threaded into the collar, a cam ring for camming together and apart the jaws, a ring mounted about the threaded sleeve and interconnected to the cam ring by three elongate braces, a T handle threaded on the threaded sleeve for reciprocally urging the cam ring under and about the jaws, a slide rod mounted through the shaft and threaded into the collar, and a slide hammer slidably mounted for reciprocal movement along the slide rod for impacting a boss located near the end of the slide rod opposite the end threaded in the collar, to remove internal bearings, bushings, seals, or the like.

The jaws have rearward portions precisely tapered to consistently and evenly control the spreading of the jaws for maximum effectiveness of locking the jaws internally about the forward end of the bearings, bushings, seals, or the like. The jaws further comprise a protruding tip integrally extending from an outer surface of the jaws which generally extend opposite the longitudinal axis of the sleeve for effectively locking internally about the forward end of the bearings, bushings, seals, or the like. The jaws have generally elongate forward portions for effective extended reach and for effectively locking about limited access bearings, bushings, seals, or the like.

It is the object of this invention to produce an internal locking puller device which provides positive locking power and no jaw slippage.

Another object of this invention is to produce an internal locking puller device which eliminates jaw flexing and twisting and is self aligning.

Also, another object of this invention is to produce an internal locking puller device which is easy to use for one person and covers those applications requiring added reach and spread of the jaws.

Further, another object of this invention is to produce an internal locking puller device which provides maximum leverage for added locking power to eliminate slippage of the jaws about the bearings, bushings, seals, or the like.

Yet another object of this invention is to produce an internal locking puller device which provides automatic, hands off control and stability of the jaws as the puller device is positioned for use.

Further objects and advantages of the present invention will become apparent as the description proceeds and when taken in conjunction with the accompanying drawing wherein:

DETAILED DESCRIPTION OF THE INVENTION

Figure 1:
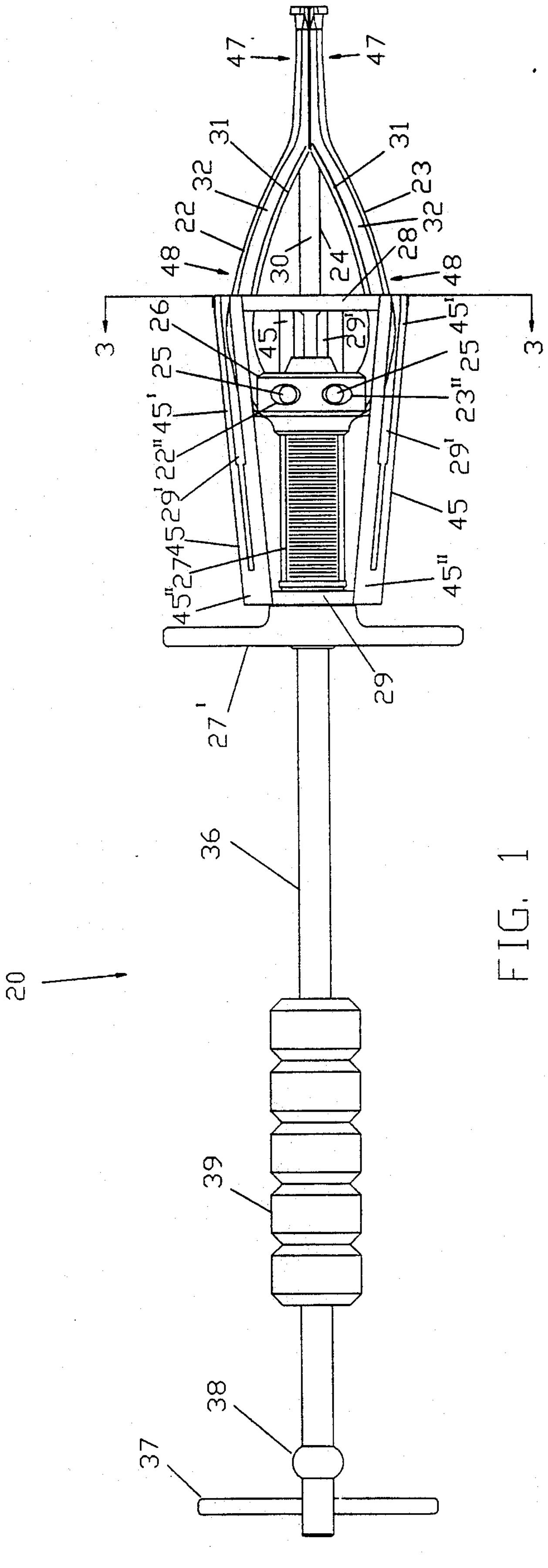
FIG. 1 is a side elevational view of the internal locking puller device illustrating the elements of the device and showing the cam ring moved rearward about the jaws camming the jaws together to a generally non-locking position.
Figure 2:
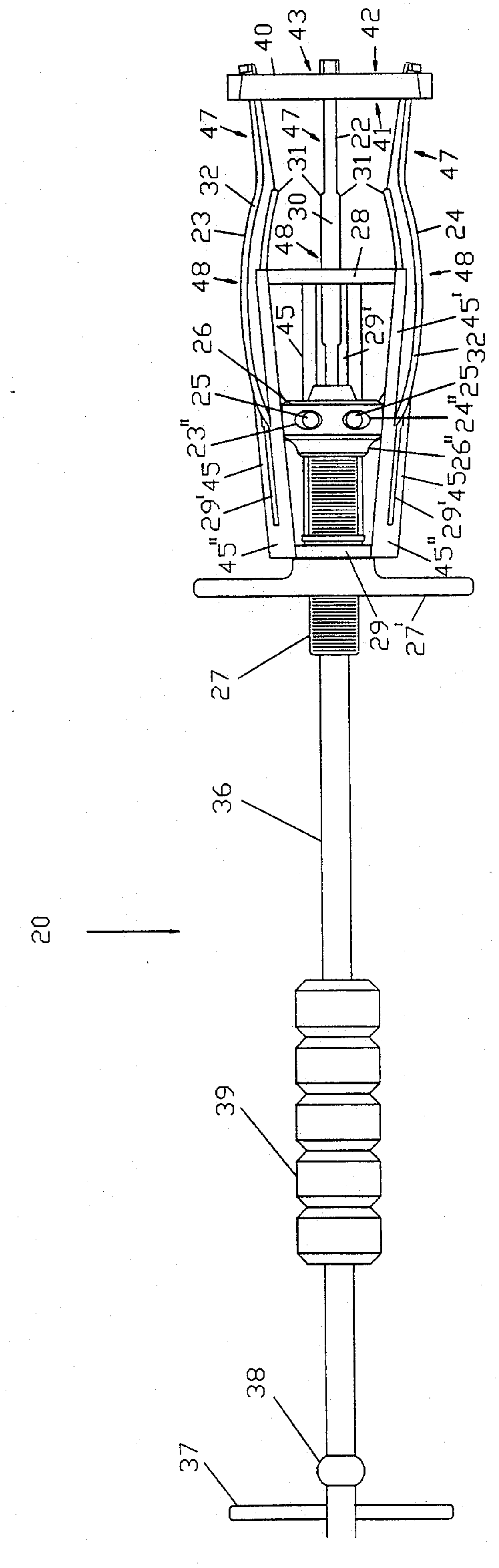
FIG. 2 is a side elevational view of the internal locking puller device illustrating the cam ring moved forward about the jaws spreading the jaws to a generally locking position internally about a forward end of a bushing.
Figure 3:
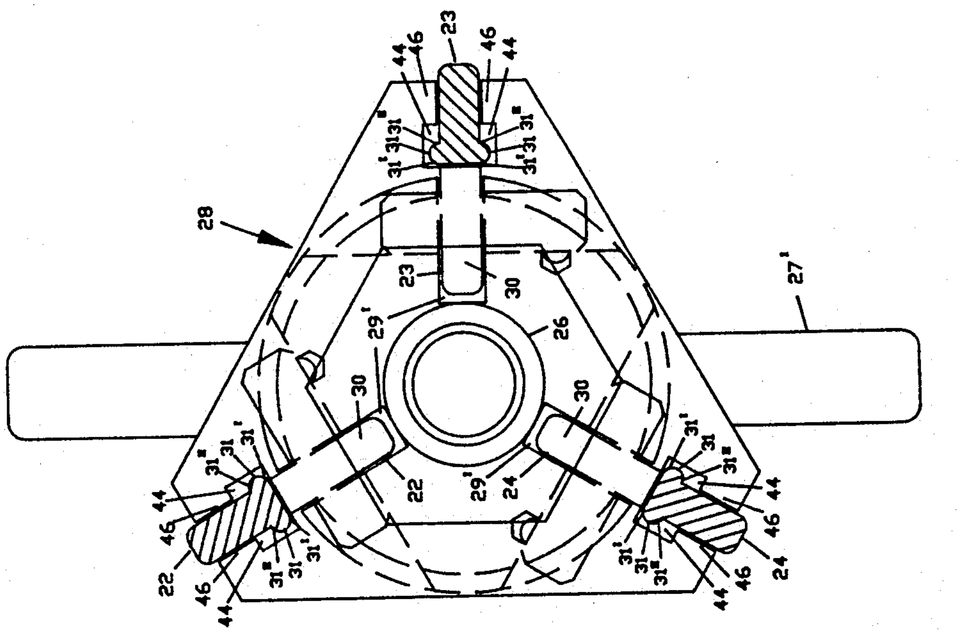
FIG. 3 is a cross-sectional view of the internal locking puller device taken along line 3—3 of FIG. 1.

Referring more particularly to the drawings in FIGS. 1, 2, 3, 4, and 5 the internal locking puller device 20 is illustrated as having a flange-less, disk-like collar 26 with a generally circular ridge-like receiving member 26" integrally extending rearwardly from the collar 26, with three axial slots 22', 23', and 24' equally spaced about the collar 26 and extending or notched into its side and into portions of its rearward and forward ends, and with three passages 22", 23", and 24" each extending through the wall of the collar 26 and substantially perpendicularly intersecting one of the axial slots 22', 23' and 24'; having a threaded sleeve 27 removably threaded into the receiving member 26" of the collar 26; and having a T handle 27' threaded on the sleeve 27 for movement forward and rearward along the sleeve 27. As shown in FIGS. 1 and 2, the internal locking puller device 20 further comprises a ring 29 rotatably mounted to the T handle 27' for movement therewith and three elongated braces 45 interconnecting the ring 29 to a generally triangular-shaped cam ring 28. The three elongated braces 45 are fixedly attached at their ends to the ring 29 and at the triangular corners of the cam ring 28. A longitudinal slot 29' extends through each brace 45 extending from the ring 29 to the cam ring 28 and is defined by longitudinal inner edges of each brace 45. Preferably, the longitudinal inner edges along the forward portion 45' of each brace 45 are uniformly recessed relative to the longitudinal inner edges along the rearward portion 45" of each brace 45. The longitudinal slots 29' are uniformly wider along the forward portion 45' of the braces 45 than they are along the rearward portion 45" of the braces 45.

Figure 4:
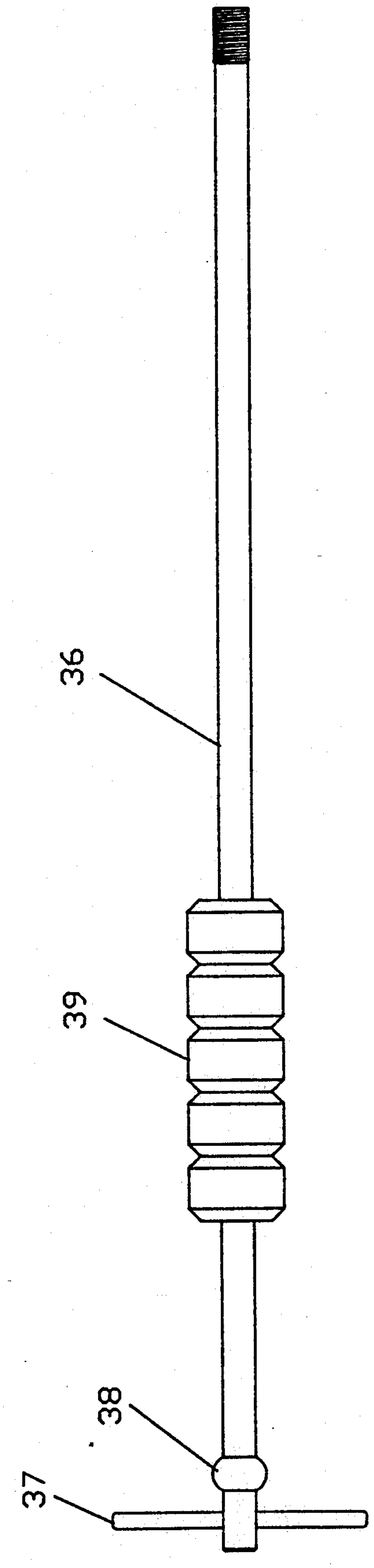
FIG. 4 is a side elevational view of the slide rod threadingly removed from the collar with the slide hammer slidably mounted on the slide rod for reciprocal movement therealong.
Figure 5:
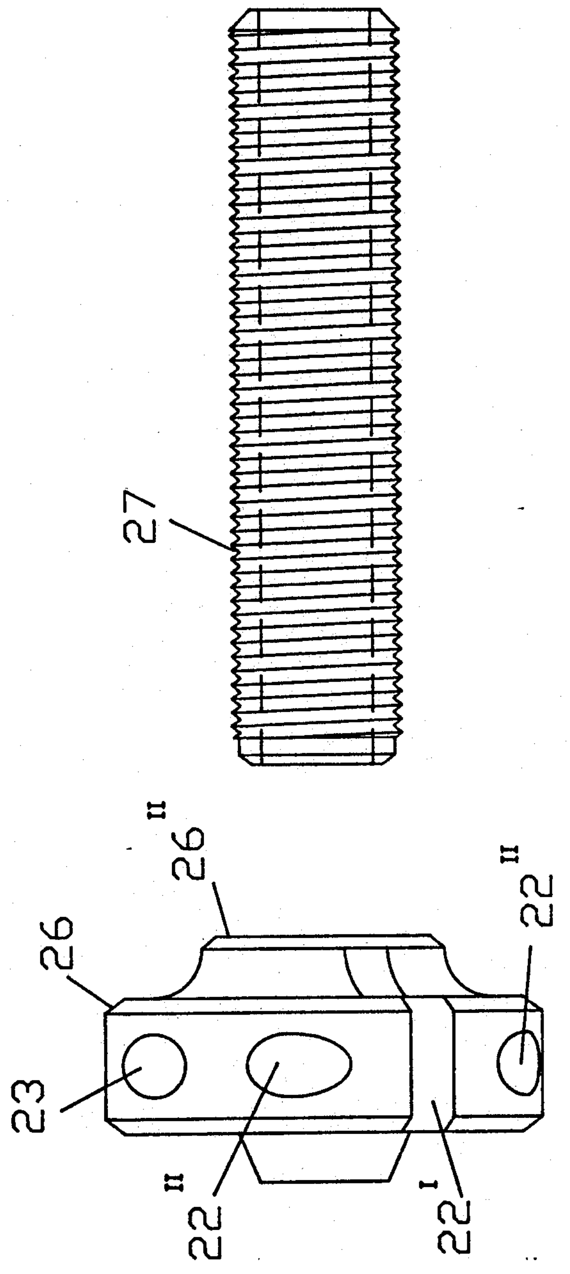
FIG. 5 is a side elevational view of the collar and the sleeve removed from the collar.

As shown in FIG. 4, the cam ring 28 has an outer edge. Three slots 44 extend into the outer edge of the cam ring 28 one at each triangular corner of the cam ring 28. Three pairs of lugs 46 integrally and radially extend inwardly on the outer edge 28" of the cam ring 28, one pair at each triangular corner of the cam ring 28, and the three pairs of lugs 46 extend inwardly into the notched areas 44 with the lugs 46 in each pair being generally opposed to one another. The slots 44 essentially separate the lugs 46 from one another in each pair and separate the lugs 46 from a portion of the outer edge of the cam ring 28 defining the inner end of the slots 44.

As shown in FIGS. 1, 2, and 4, the cam ring 28 is slidably mounted along three jaws 22, 23, and 24 which have under surfaces 30 upon which the cam ring 28 slidably engages during the spreading and locking of the jaws 22, 23, and 24. The jaws 22, 23, and 24 each further comprises an arcuate rearward portion 48 and an elongate forward portion 47. The jaws 22, 23, and 24 have rearward ends pivotally mounted in the axial slots 22', 23', and 24' of the collar 26. The jaws 22, 23, and 24 have a pair of arcuate rails 31 fixedly and longitudinally extending along under edges of the jaws 22, 23, and 24 and along the arcuate rearward portion 48 of each jaw and laterally extending from the under edges at the under surface 30 of the jaws 22, 23, and 24. The rails 31 have under surfaces 31' which are generally flush to the under surfaces 30 of the jaws 22, 23, and 24 and have outer surfaces 31" which are engageable to the lugs 46 when the jaws 22, 23, and 24 are being cammed together. The jaws 22, 23, and 24 effectively and operatively extend through the longitudinal slots 29' of the braces 45 with the rails 31 slidably and securely mounted through the slots 44 on said cam ring 28 and with the jaws 22, 23, and 24 slidably positioned between the pairs of opposed lugs 46. The jaws 22, 23, and 24 are operatively and effectively mounted through the longitudinal slots 29' so as to minimize flexing and twisting of the jaws 22, 23, and 24. The longitudinal slots 29' along the forward 45' and rearward 45" portions of the braces 45 have sufficient widths to provide clearance for the jaws 22, 23, and 24 without sacrificing the locking strength of the jaws 22, 23, and 24.

The rearward ends of the jaws 22, 23, and 24 have holes (not shown) therethrough for mounting the jaws 22, 23, and 24 with three ball lock pins 25 in the axial slots 22', 23' and 24' of the collar 26. Each pin 25 is mounted through one of the three passages 22", 23" and 24" and lockingly secures the jaws 22, 23, 24 in their respective slots. The jaws 22, 23, and 24 are generally pivotally mounted in opposition about the collar 26. The jaws 22, 23, and 24 have protruding tips extending outwardly from the outer surfaces 32 near the forward ends of the jaws 22, 23, and 24, for locking internally about the object.

As shown in FIGS. 1, 2, and 4, the locking puller device 20 further comprises a slide rod 36 which extends through the sleeve 27 and is securely threaded in the collar 26. At the end of the slide rod 36 opposite the end threaded in the collar 26 is a T crosspiece handle member 37 used for threading the slide rod 36 into the collar 26 and for controlling the puller device 20 during operation thereof. A boss 38 is integrally formed or welded about the slide rod 36 near and forward the T crosspiece handle member 37. A substantially cylindrical slide hammer 39 having a longitudinal bore extending therethrough is slidably mounted on the slide rod 36 forward the boss 38 for reciprocal movement along the slide rod 36 to effectively impact the boss during operation of the puller device 20 to remove bushings, bearings, seals, or the like. Preferably, all the elements of the locking puller device are made from metal.

To remove bushings, bearing, seals, or the like, the internal locking puller device 20 is positioned before the object 40 to be removed, which essentially has, as shown in FIG. 2, a bore 43 extending therethrough from a rearward end 41 to a forward end 42. To remove the object 40, the jaws 22, 23, and 24 are mounted through the bore 43 of the object 40 from the rearward end 41 to the forward end 42 with the protruding tips 21 of the jaws 22, 23, and 24 extending outward beyond the forward end 42 of the object 40. To mount the jaws 22, 23, and 24 through the bore 43 of the object 40 as shown in FIG. 2, the jaws 22, 23, and 24 are cammed together to make the diameter of the jaws 22, 23, and 24 smaller than the diameter of the bore 43 so that the jaws 22, 23, and 24 can be inserted through the bore 43 of the object 40. To cam the jaws 22, 23, and 24 together, the T handle 27' is rotated rearward, effecting rearward movement of the ring 29 resulting in the lugs 46 slidably engaging the outer surface 31" of the rails 31, thus camming the jaws 22, 23, and 24 inwardly toward each other. The forward ends of the jaws 22, 23, and 24 are mounted through the inner opening of the object 40 with the protruding tips 21 extending inwardly beyond the forward end 42 of the object 40.

To lock the puller device 20 about the forward end 42 of the object 40, the T handle 27' is rotated forward, effecting forward movement of the cam ring 28 over the under surface 30 of the jaws 22, 23, and 24. As shown in FIG. 2, the outer edge 28" of the cam ring 28 slidably engages the under surface 31' of the rails 31 and the under surface 30 of the jaws 22, 23, and 24 urging the jaws 22, 23, and 24 apart. As the jaws 22, 23, and 24 are being cammed apart, the protruding tips 21 of the jaws 22, 23, and 24 engage internally about the forward end 42 of the object 40. The T handle 27' is rotated forward until the jaws 22, 23, and 24 are securely locked internally about the object 40 to be removed. The arcuate rearward portions 48 of the jaws 22, 23, and 24 provide consistent and uniform spreading of the jaws 22, 23, and 24 at equal, uniform increments of force throughout, thus minimizing slippage of the jaws 22, 23, and 24 from internally about the object 40 as the jaws 22, 23, and 24 are securely locked internally about the object 40. Upon a complete rotation of the T handle 27', all the jaws 22, 23, and 24 spread or cam together at equidistances, and as the jaws 22, 23, and 24 are locked internally about the object 40, the amount of force applied by any one jaw is substantially equal to the amount of force applied by the other jaws so that the jaws 22, 23, and 24 uniformly, consistently, and securely lock internally about the object 40, eliminating one jaw being securely locked internally about the object 40 and the other jaw or jaws not being securely locked internally about the object 40, thus preventing any slippage of the jaws 22, 23, and 24. Further, the arcuate rearward portion 48 of the jaws 22, 23, and 24 provide an optimal distance between the pivot points of the jaws 22, 23, and 24 and the cam ring 28 to maximize leverage and increase locking strength of the jaws 22, 23, and 24 about the object 40.

To remove the object 40, the slide hammer 39 is slid to the forwardmost position along the slide rod 36 and rearward force is applied to the slide hammer 39 by the hand of the user to forcefully impact the boss 38 on the slide rod 36. The slide hammer 39 is reciprocated along the slide rod 36 with the impacting force directed toward the boss 38 near the rearward end of the slide rod 36 to generate rearward movement of the jaws 22, 23, and 24 and the object 40 relative to the original position of the object 40 to remove the object 40. Once the object 40 is removed, the object 40 is then removed from the jaws 22, 23, and 24 by camming together the jaws 22, 23, and 24. The T handle 27' is rotated rearward, effecting rearward movement of the cam ring 28 and effecting the lugs 46 into engagement with the rails 45. The protruding tips 21 of the jaws 22, 23, and 24 are disengaged from the forward end 42 of the object 40, permitting the jaws 22, 23, and 24 to be withdrawn from the object 40 by sliding the jaws 22, 23, and 24 back through the bore 43 out the rearward end 41 of the object 40.

It will be obvious that the various changes and departures may be made to the invention without departing from the spirit and scope thereof. Accordingly, it is not intended that the invention be limited to that specifically described in the specification or as illustrated in the drawing but only as set forth in the claims.

What is claimed is:

1. An internal locking puller device comprising:
a collar having a plurality of slots axially extending through a wall thereof and having a receiving member integrally protruding rearwardly therefrom, said slots generally equally spaced about said collar, an elongate threaded sleeve removably threaded in said receiving member of said collar,
a T handle threaded on said sleeve for forward and rearward movement along said sleeve,
a ring rotatably mounted to said T handle for movement therewith,
a cam ring forward of said ring and interconnectively attached to said ring by a plurality of braces, each said brace having a longitudinal slot extending therethrough and extending from said cam ring to said ring, said cam ring further having an outer edge and having a plurality of slots in said outer edge,
lug means integral to and radially extending inwardly from an outer edge of said cam ring,
a plurality of jaws having rearward ends pivotally and removably mounted with pins in said slots about said collar, also said jaws mounted in opposition about said collar, each said jaws further having a pair of rails integral to and longitudinally extending along under edges of said jaws and laterally extending from said under edges at under surfaces of said jaws,
a slide rod mounted through said sleeve and threaded into said collar, said slide rod having an impacted means and a handle means at an end thereof opposite said end threaded into said collar, and
a slide hammer slidably mounted on said slide rod for reciprocal movement along said slide rod for impacting force on said impacted means to force rearward movement of the object relative to its original position.

2. An internal locking puller device as described in claim 1, wherein said lug means comprises a plurality of pairs of opposed lugs integrally extending generally inwardly on said outer edge of said cam ring and extending inwardly in said plurality of slots of said cam ring.

3. An internal locking puller device as described in claim 1, wherein said plurality of jaws extend through said plurality of longitudinal slots of said braces to minimize twisting and flexing of said jaws.

4. An internal locking puller device as described in claim 3, wherein said plurality of jaws have an arcuate rearward portion to provide uniform locking force across all said jaws and to provide substantial leverage to maximize locking strength internally about said object.

5. An internal locking puller device as described in claim 4, wherein said plurality of jaws further have an elongate forward portion for extended reach, capable of effectively removing limited access objects.

6. An internal locking puller device as described in claim 1, wherein said rails are integral to and extend longitudinally along said arcuate rearward portions of said jaws at said under surfaces of said jaws, to provide uniform locking strength and uniform control across all said jaws.

7. An internal locking puller device as described in claim 6, wherein said rails are slidably and securely mounted through said slots of said cam ring between said lugs and a portion of said outer edge of said cam ring defining inner ends of said slots, for slidable engagement of said lug means to said rails to cam together said jaws.

8. An internal locking puller device as described in claim 1, wherein said under surfaces of said jaws are slidably mounted through said slots of said cam ring, for slidable engagement of said cam ring to said under surfaces to cam apart said jaws.

* * * * *